UNITED STATES PATENT OFFICE.

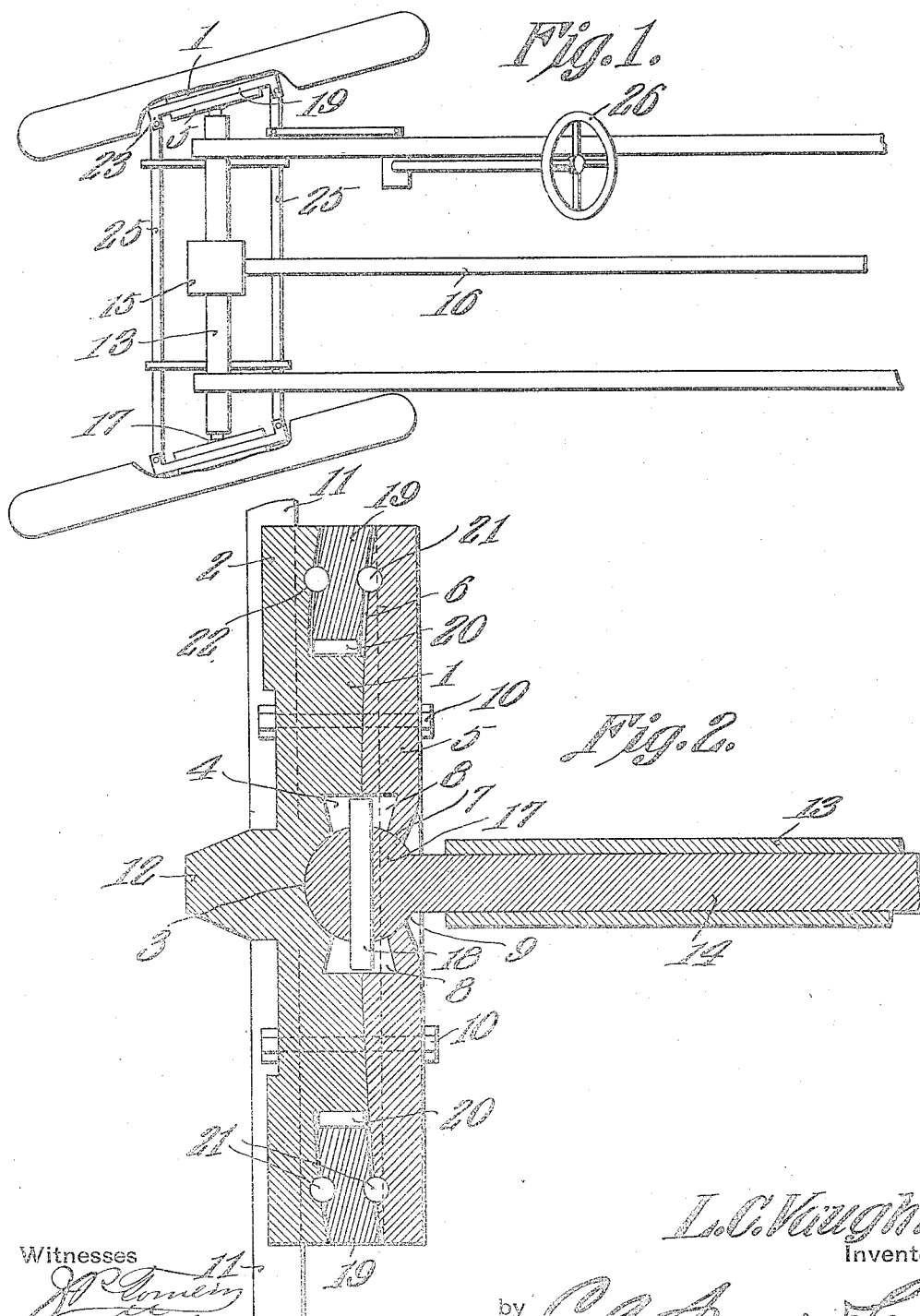

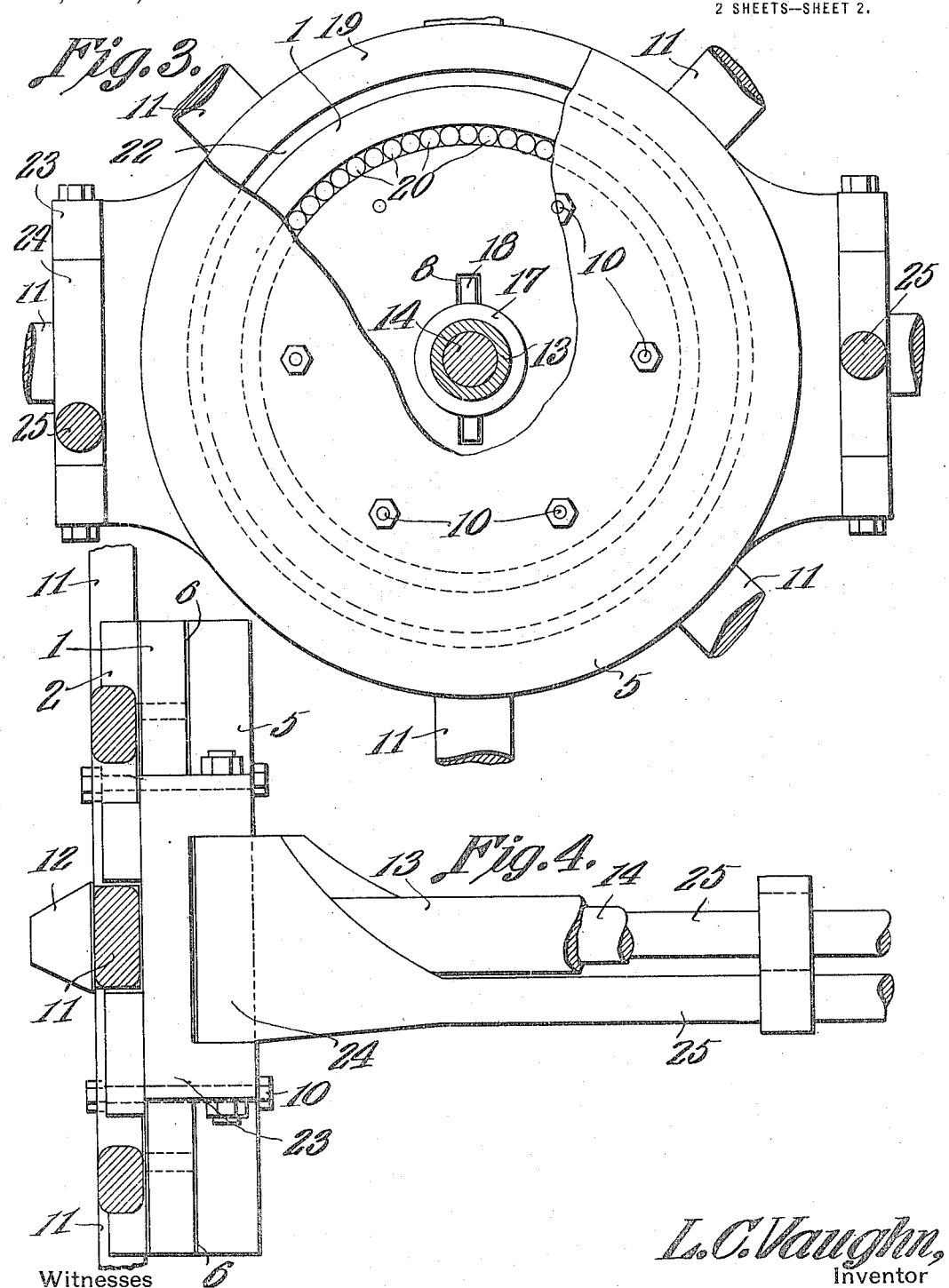

LEWIS C. VAUGHN, OF FORKSTON, PENNSYLVANIA.

STEERING MECHANISM FOR MOTOR-VEHICLES.

1,152,455. Specification of Letters Patent. Patented Sept. 7, 1915.

Application filed May 1, 1911. Serial No. 624,432.

*To all whom it may concern:*

Be it known that I, LEWIS C. VAUGHN, a citizen of the United States, residing at Forkston, in the county of Wyoming and State of Pennsylvania, have invented a new and useful Steering Mechanism for Motor-Vehicles, of which the following is a specification.

This invention relates to steering mechanism for motor vehicles and more particularly to means whereby the front wheels of a motor vehicle may be turned to steer the vehicle during the direct application of power to said wheels, the axle supported by the wheels being adapted to rotate and having a novel connection with each wheel whereby power may be transmitted therefrom to the wheel irrespective of the angle assumed by the wheel relative to the axle.

A further object is to provide a wheel hub of novel form.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings the preferred form of the invention has been shown.

In said drawings,—Figure 1 is a plan view of a portion of a motor vehicle having the present improvements applied thereto. Fig. 2 is an enlarged central vertical transverse section through the hub portion of one of the wheels and showing its connection with the axle. Fig. 3 is an elevation of the inner portion of one of the hubs, the face plate thereof being partly broken away and the axle and steering rods being shown in section. Fig. 4 is a rear elevation of the hub and parts connected thereto.

Referring to the figures by characters of reference 1 designates the circular body of the hub, said body being provided with an annular flange 2 extending from the outer portion thereof while formed in the inner face of the body at the center thereof is a semi-spherical recess 3 having diametrically opposed recesses 4 in the walls thereof. A face plate 5 is adapted to be bolted or otherwise secured to the inner face of the hub body 1 and its diameter is preferably equal to the greatest diameter of the flange 2, this face plate and the flange coöperating to form an annular channel 6 around the body 1. A substantially semi-spherical recess 7 is formed in that face of the plate 5 nearest the body 1, this recess being adapted to register with the recess 3 and being formed with diametrically opposed recesses 8 adapted to register with the recesses 4. An opening 9 extends through the center of the face plate 5 and into the recess 7, the wall of this opening being flared outwardly. The face plate 5 is secured to the hub body 1 by bolts 10 or the like and the spokes 11 of the wheel are secured within and extend beyond the outer face of the hub body. Said hub body may be formed with a central projecting portion 12 upon its outer face constituting an abutment for the inner ends of the spokes. The usual tubular axle 13 is provided, and journaled therein are alining axle shafts 14 connected, at the center of the axle by a differential gear, the casing of which is indicated generally at 15, the drive shaft of the vehicle being shown at 16 and extending into the casing 15. The outer end of each axle shaft 14 extends through the opening 9 in the adjacent face plate 5 and has a ball 17 bearing within the recesses 3 and 7. A coupling pin 18 extends diametrically through the ball and its ends are fitted loosely within the recesses 4 and 8, thus preventing the axle shaft from rotating independently of the wheel hub but, at the same time, permitting said hub to tilt to different angles relative to the axle shaft.

A ring 19 extends around the hub body 1 and between flange 2 and the face plate 5, there being a series of anti-friction rollers 20 interposed between this ring and the hub body 1, while a series of anti-friction balls 21 are interposed between the ring 19 and the flange 2 and between said ring 19 and the face plate 5, these balls traveling within grooves 22 provided therefor.

The side walls of the annular channel 6 are concavo-convex, the outermost surface having the concave characteristics. The ring 19 is of concavo-convex contour, the convex being the outer surface to fit within the said channel. The outstanding projections which support the ears 23 engage the ring at points spaced apart a distance greater than the engagement between the ring and the side walls of the channel. Thus, a stress transmitted to the ring through the instrumentality of the outstanding projections and resisted by the side walls of the channel, or a stress in the opposite direction and conversely borne, will be taken up by the ring 19, by an internal compression rather than by producing abnormal bending moments therein. Particular attention is also called to the fact that the offset ears 23 project at right angles from the outstanding projections with which the ring is equipped. This arrangement of the ears provides that should one of the bolts by means of which the steering knuckles 24 are secured to the outstanding ears 23, fail, or should be incapable of resisting certain normal or abnormal stresses brought to bear thereon, the complete fracture of the bolt will be prevented by the steering knuckle being thrust forwardly against the outstanding projections.

Ears 23 extend from the ring 19 at diametrically opposed portions thereof, and the knuckles 24 of parallel steering rods 25 are pivotally connected with these ears, the rear rod 25 being preferably supported in a lower horizontal plane than the front rod 25 so as to permit the drive shaft 16 to pass thereover. These rods 25 are adapted to be shifted by mechanism of the usual or any preferred type, the steering wheel of said mechanism being indicated at 26.

It will be apparent that when the axle shafts 14 are rotated, motion will be transmitted therefrom by pins 18 to the walls of the recesses 4 and 8, thus causing the hub 1 and the face plate 5 which is secured thereto, to rotate relative to the ring 19, said ring being held against rotation by the steering rods 25 engaging extensions on the axle casing. By shifting these rods in opposite directions, the ring 19 can be caused to swing about a vertical axis, the wheel being likewise moved about said axis without, however, being placed out of operative relation with the shaft.

It is to be understood that, if desired, the balls 17 can be extended into the hub sufficient distances to lie directly in the center of the plane in which the wheel rim and spokes are located.

From the foregoing it will be apparent that power can be transmitted not only to the rear wheels of a motor vehicle but also to the front or steering wheels thereof, and said front wheels can be readily shifted to guide the machine while they are being rotated at any desired speed by their revolving axle shafts.

What is claimed is:—

1. A device of the class described, comprising a hub with an arcuate annular groove with the center of curvature of the groove arcuation remote from the side of the hub to which a wheel is secured, a concavo-convex ring fitting within the said arcuate groove and provided with outstanding portions, and means for securing steering rods to the outstanding portions of said ring.

2. A mechanism of the class described, including a hub with an arcuate annular groove extending around the outer periphery thereof, the center of curvature of the arcuation of the groove lying upon that side of the hub which is secured to a vehicle axle, a concavo-convex ring fitting within the groove and provided with outstanding portions extending therebeyond, ears mounted upon and extending at right angles to the said outstanding portions of the ring, knuckles pivotally secured to the said ears, steering bars connected to said knuckles with their line of thrust passing through the said outstanding portions of the ring, the arrangement of the ears preventing a bending of the pivotal connection between the ears and knuckles.

3. A device of the class described, comprising a hub with an annular groove extending therearound, said groove provided with concavo-convex side walls, the concave side wall lying adjacent the outer side of the wheel, a concavo-convex ring fitting within the said groove and provided with outstanding projections, anti-friction means engaging and adapted to transmit a stress between the said ring and groove, and means for engaging the said outstanding projections at points spaced apart a distance relatively greater than the diametric spacing of the said anti-friction means.

In testimony that I claim the foregoing as my own, I have hereto affixed my signature in the presence of two witnesses.

LEWIS C. VAUGHN.

Witnesses:
S. C. MESSERSMITH,
WALTER WHEATLEY.